United States Patent
Wagner

(10) Patent No.: US 8,581,717 B2
(45) Date of Patent: *Nov. 12, 2013

(54) METHOD, SYSTEM, AND SYSTEM COMPONENTS FOR WIRELESS TIRE PRESSURE MONITORING

(75) Inventor: Markus Wagner, Ludwigsburg (DE)

(73) Assignee: Huf Hulsbeck & Furst GmbH & Co. KG, Velbert (DE)

( * ) Notice: Subject to any disclaimer, the term of this patent is extended or adjusted under 35 U.S.C. 154(b) by 244 days.

This patent is subject to a terminal disclaimer.

(21) Appl. No.: 12/989,866

(22) PCT Filed: Apr. 28, 2009

(86) PCT No.: PCT/DE2009/000580
§ 371 (c)(1),
(2), (4) Date: Oct. 27, 2010

(87) PCT Pub. No.: WO2009/132623
PCT Pub. Date: Nov. 5, 2009

(65) Prior Publication Data
US 2011/0043352 A1    Feb. 24, 2011

(30) Foreign Application Priority Data
Apr. 29, 2008   (DE) .................. 10 2008 021 466

(51) Int. Cl.
*B60C 23/00* (2006.01)
(52) U.S. Cl.
USPC ............. 340/442; 340/444; 340/447; 73/146; 73/146.5
(58) Field of Classification Search
USPC ......... 340/442, 444, 445, 447; 73/146, 146.2, 73/146.4, 146.5
See application file for complete search history.

(56) References Cited

U.S. PATENT DOCUMENTS

| 6,034,597 | A | 3/2000 | Normann et al. | |
|---|---|---|---|---|
| 6,232,875 | B1 * | 5/2001 | DeZorzi | 340/442 |
| 6,963,274 | B2 * | 11/2005 | Saheki et al. | 340/447 |
| 7,034,671 | B2 * | 4/2006 | Miyazaki | 340/445 |
| 7,212,105 | B2 * | 5/2007 | Okubo | 340/447 |
| 7,443,288 | B2 * | 10/2008 | Dunbridge et al. | 340/444 |

(Continued)

FOREIGN PATENT DOCUMENTS

| DE | 37 03 128 A1 | 8/1988 |
|---|---|---|
| DE | 10 2004 042 191 B3 | 2/2006 |

OTHER PUBLICATIONS

Bochmann, H., Kessler, R., Schulze, G., "Entwicklungen bei Reifendruck-Kontrollsystemen" in ATZ Feb. 2005, Jahrgang 107, S. 110-117.

*Primary Examiner* — Toan N Pham
(74) *Attorney, Agent, or Firm* — Hackler Daghighian & Martino

(57) ABSTRACT

Disclosed is a method for monitoring and wirelessly signaling data that contains information on the pressure states prevailing in tires of wheels of a vehicle. In the method, electronic modules that are arranged in the wheels wirelessly transmit the data to control device which is arranged in the vehicle. No data is transmitted during a first mode associated with a standstill state of the vehicle, while the respective electronic module transmits the data to the control device in the form of telegrams, during at least one other mode associated with another state of the vehicle. The respective electronic module at least temporarily transmits n telegrams containing the data per time unit to the control device, n being a function of time.

5 Claims, 6 Drawing Sheets

(56) References Cited

U.S. PATENT DOCUMENTS

| | | |
|---|---|---|
| 8,063,756 B2 * | 11/2011 | Watabe .................. 340/447 |
| 2002/0075144 A1 | 6/2002 | DeZorzi |
| 2005/0073400 A1 | 4/2005 | Buck et al. |
| 2005/0110623 A1 | 5/2005 | Schulze et al. |
| 2005/0179530 A1 | 8/2005 | Stewart et al. |
| 2006/0161327 A1 | 7/2006 | Emmerich et al. |
| 2007/0069879 A1 | 3/2007 | Kuchler |
| 2011/0043353 A1 * | 2/2011 | Wagner .................. 340/442 |

* cited by examiner

METHOD, SYSTEM, AND SYSTEM COMPONENTS FOR WIRELESS TIRE PRESSURE MONITORING

The invention relates to a method for monitoring and wirelessly signaling data containing information about the pressure conditions present in the pneumatic tires of wheels of a vehicle.

The invention further relates to a system suited therefor, to system components, such as a controller which is disposed in the vehicle, and an electronic module which is disposed in one of the wheels and wirelessly transmits data to the controller.

The article "Tyre Safety Systems—TSS" from February 2005, published in "automobiltechnische Zeitschrift (ATZ)" (edition 2/2005, VIEWEG publishing house, Germany), describes tire pressure control systems, wherein a variety of data containing information about the conditions present in pneumatic tires of wheels of a vehicle is monitored and wirelessly signaled. As is described in the article based on illustrations 3 and 4, such a known system comprises a plurality of electronic modules, which are disposed in the wheels of the vehicle and are also referred to as wheel electronics. By way of sensors, they capture the conditions present in the respective pneumatic tire, such as the pressure and temperature, and transmit corresponding data to a central unit, that is, a central controller disposed in the vehicle (see illustration 1 in the article). This controller in turn evaluates the data, for example in order to actuate a tire pressure indicator (see illustration 5) attached in the interior of the vehicle. Because the wheel electronics units are supplied by a miniature battery, typically a lithium battery, care must be taken that little current or energy is consumed, in order to achieve as long a service life of the battery as possible. For this purpose, for example, the measurement cycles of the sensors are influenced depending on the vehicle movement (see article page 3, paragraph 2.2). The data is therefore captured at shorter measurement intervals and transmitted only when the vehicle is moving. The data is preferably transmitted in the form of a datagram (see article, table 2).

In certain system, controlling the emission of the datagrams can also be done by an interrogator or carrier transmitter. In this case, a trigger signal is transmitted by the controller in order to activate the respective wheel electronics unit as needed, so that the wheel electronics unit then captures the data and transmits it to the controller. For this solution, a reverse channel and a trigger transmitter and receiver are required. While it is possible in this way to specifically address the individual wheel electronics units in the wheels in order to detect the exact position allocation of the wheels, for example, this solution requires a certain level of complexity. As is also described in the article based on illustration 1, right illustration, newer systems are supposed to eliminate a reverse channel and a trigger transmitter and receiver to the extent possible.

It is also known from EP 1467877 B1 to activate the respective wheel electronics unit only as needed by way of an interrogator, that is a trigger transmitter, in order to increase the service life the battery. In this document, particularly reliable tire pressure monitoring is achieved in that the system is designed such that the wheel electronics unit automatically transmits the data at a predeterminable minimum transmission rate, even if the interrogation signal fails, for whatever reason. In this way, an interrogator may be foregone in the method and system described there. However, the data would then only be transmitted at a relatively low transmission rate.

From EP 0915764 B1 a method is known for processing signals of a tire pressure monitoring system, wherein the wheel electronics units automatically transmit data to the controller in the form of datagrams and no specific triggering or interrogation is required. Yet, in order to also be able to determine the wheel positions without triggering and/or a reverse channel, it is proposed to provide a plurality of receiving antenna on the controller, which jointly process the signals received via the antennas and analyze them for the signal intensity thereof. By cyclically deactivating the individual receiving antennas, it can then be determined what deactivation point results in the greatest intensity loss in the radio signal, wherein it is assumed that it must be the antenna located closest to the wheel electronics unit.

This solution thus can completely forego a trigger system, however greater complexity is required on the part of the receiving antennas. Furthermore, a method is known which utilizes a duty cycle of 50% LF in standstill and 100% in driving operation, resulting the corresponding energy consumption.

SUMMARY OF THE INVENTION

It is therefore the object of the present invention to propose a method and a system or apparatus of the type mentioned above, which overcome the disadvantages described and still can be implemented with low complexity. In particular a method for monitoring and wirelessly signaling data and a system suited therefor, as well as the associated system components are to be proposed, by which a reduction in the power requirement of the wheel electronics units can be achieved.

The object is achieved by a method having the characteristics of claim 1 and by a system, a controller, and an electronic module having the characteristics of the relevant independent claim.

It is therefore proposed that during a first mode, which is associated with a stopped state of the vehicle, no data is transmitted, and that during at least one further mode, which is associated with a different state of the vehicle, the data is transmitted in the form of datagrams by the respective electronic module or the wheel electronics unit to the controller, wherein at least intermittently the electronic module consecutively transmits a plurality of datagrams containing the same data in a cumulative manner to the controller.

As a result of this type of transmission, a bundled accumulation of a plurality of datagrams (here also referred to as burst mode) takes place, so that the required data is transmitted only intermittently to the controller, but then in a lumped form. This enables the wheel position to be learned. In this way, the overall transmission duration is shortened, however the actual usage period for transmitting the data is not or only insignificantly shortened due to the accumulation of the datagrams, so that no data loss occurs.

Advantageous embodiments of the invention will be apparent from the dependent claims.

It is therefore advantageous for the data to be transmitted in the form of a first datagram during a second mode, which is associated with a driving state of the vehicle, and for the data to be transmitted only partially in the form of a second datagram, which is shorter than the first datagram, during a third mode, which is associated with a starting state of the vehicle. In this way, another differentiation is made between the actual driving state of the vehicle and a starting state, wherein during the starting phase a shorter form of datagrams and/or the lowest possible data volume are transmitted, because particularly in this state the demand for data is greater. In order to meet this increased demand for data on the part of the controller, without placing undue burden on the batteries of the wheel electronics units, the datagrams are shortened to the necessary minimum. The accumulation of the datagrams in turn ensures that the controller safely receives all data of the plurality of wheel electronics units, which is used, for example, to differentiate between the axles. This transmission is also referred to here as burst mode, wherein it should clarified that this transmission is not to be confused with burst radio transmission known from the field of mobile communications.

In this context it is particularly advantageous for the respective electronic module or the wheel electronics unit to consecutively transmit a plurality of the second datagrams containing the same data in a cumulative manner to the controller at least or exclusively during the third mode, which is associated with the starting mode of the vehicle. Thus, if a bundle of a plurality of shortened datagrams is transmitted, preferably in the starting state, it can be ensured within the relatively short starting phase that all required data is transmitted because of the higher usage data density. In addition, a reduction in the power requirement and consequently less impact on the battery of the wheel electronics unit are achieved because of the shortness of the datagrams, while allocating the positions of the plurality of wheel electronics units at the same time.

It is also advantageous for the data in the second datagram to contain at least or exclusively information about the direction of rotation of the respective wheel, and for the direction of rotation to be evaluated, so as to determine whether the respective wheel is located on the left side or on the right side of the vehicle. As a result of these measures, detecting the approximate wheel position is very easy to do, so that it can at least be determined from which vehicle side the data is transmitted. For this, no reverse channel and/or trigger transmitter whatsoever are required. Only the direction of rotation must be detected. For this purpose, preferably a movement and/or acceleration sensor is used, which is accommodated in the electric module.

It is also particularly advantageous for the data in the second datagram, this being the shortened datagram, to contain at least no information about the condition present in the respective wheel and/or about the temperature and/or pressure present in the respective wheel. In this way, the second datagram can also be shortened in the starting mode in that only data which is required for determining the approximate or more precise wheel position is transmitted.

In contrast, it is advantageous for the data in the first datagram to contain at least information about the pressure condition in the wheel and/or the temperature present there. In this way, the longer datagram is used as extensively as possible in the driving mode. In this context it is advantageous for the information about the pressure condition to be determined by way of a pressure sensor that is integrated in the wheel electronics unit or for the information about the temperature to be determined by way of an integrated temperature sensor.

The controller can preferably also evaluate the data received from the respective module (wheel electronics unit) and/or supplement it with additional data.

It is also particularly advantageous for the controller and/or a wireless receiving means connected thereto, such as an antenna, to be disposed at varying distances with respect to the wheel axles of the vehicle, and for radio signals received from the respective module to be compared to each other in the controller based on the received field strengths thereof, so as to determine whether the respective wheel is located on one of the front or on one of the rear wheel axles. In this way, it is determined in a simple manner on the basis of the received field strengths as to whether the respective wheel electronics unit is attached to a front or rear axle. In this context it is further advantageous for the information about the direction of rotation of the respective wheel contained in the received data to be evaluated based on the reception-amplifying received signals, so as to determine at which location the respective wheel is. In this way, on the basis of the direction of rotation, it can therefore first be determined whether the respective wheel is located on the left or right vehicle side, and then it can immediately be evaluated, on the basis of the received field strengths, whether the wheel is located on a front or rear axle. In summary, in this way the individual wheel position can be specifically, quickly and easily determined.

BRIEF DESCRIPTION OF THE DRAWINGS

It is also preferable for the controller to provide the data it evaluated and/or supplemented as results data by way of an interface, notably a data bus, to other devices and/or modules installed in the vehicle. The controller can be designed as a central data capturing and evaluation unit, which provides the results data to other devices and/or modules, such as display apparatuses, by way of a preferably standardized interface. In this context, it is advantageous for the controller to provide the results data in the form of a third datagram by way of the data interface and/or the data bus. This datagram can be configured independently of the radio datagrams mentioned above and, for example, be a standardized data bus datagram, such as for a CAN bus or the like. It is further advantageous if the duty cycle is switched as a function of the number of driving cycles—the switch between stopped mode and driving operation—of, for example, 50 from 50%/100% to 0%/100%, which results in further energy savings.

It is further advantageous to activate a stopped mode having a duty cycle of 0% LF after production of the wheel electronics.

Figure 1:
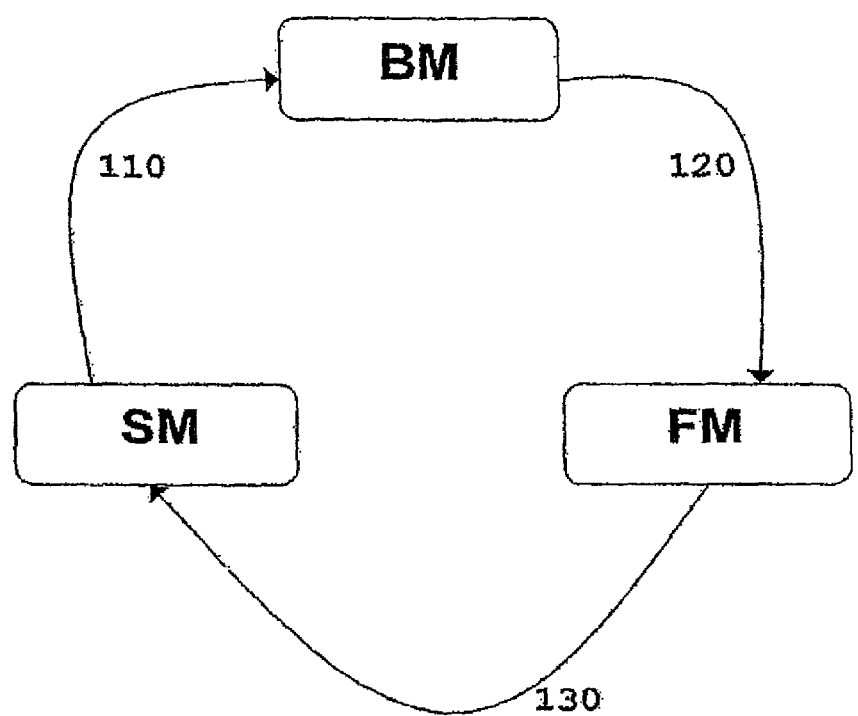
Figure 2:
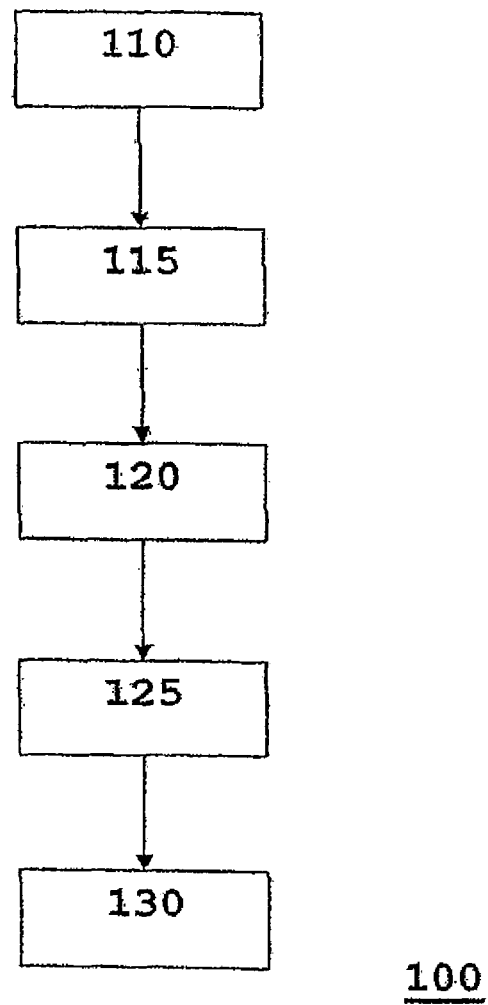
Figure 3:
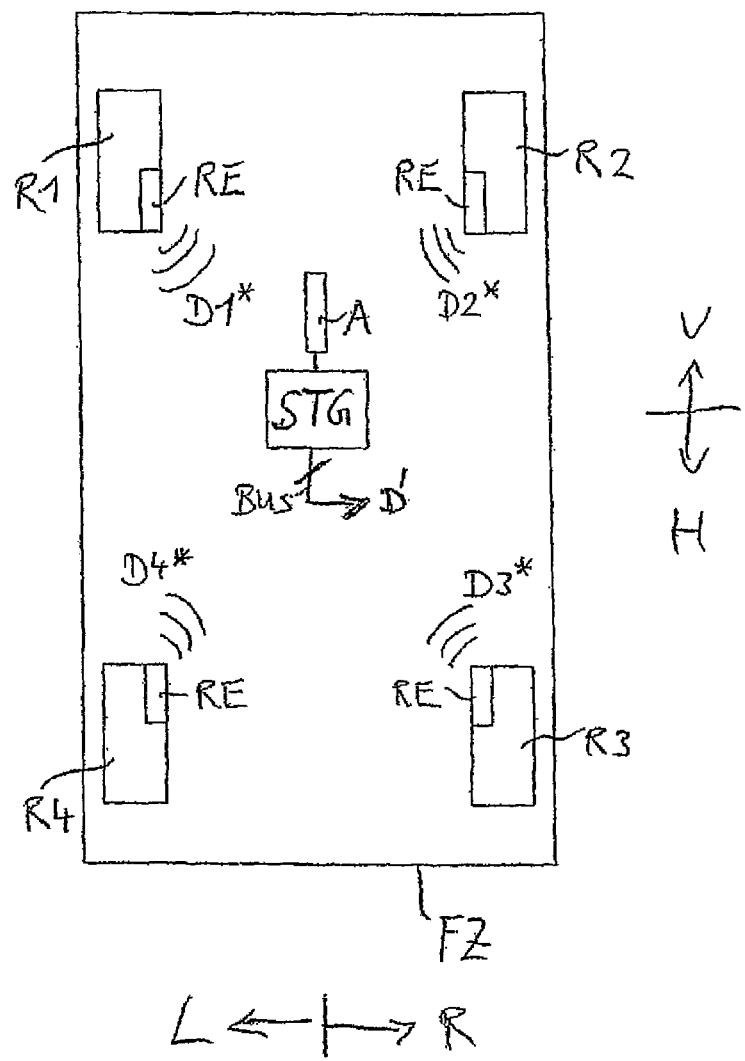
Figure 4:
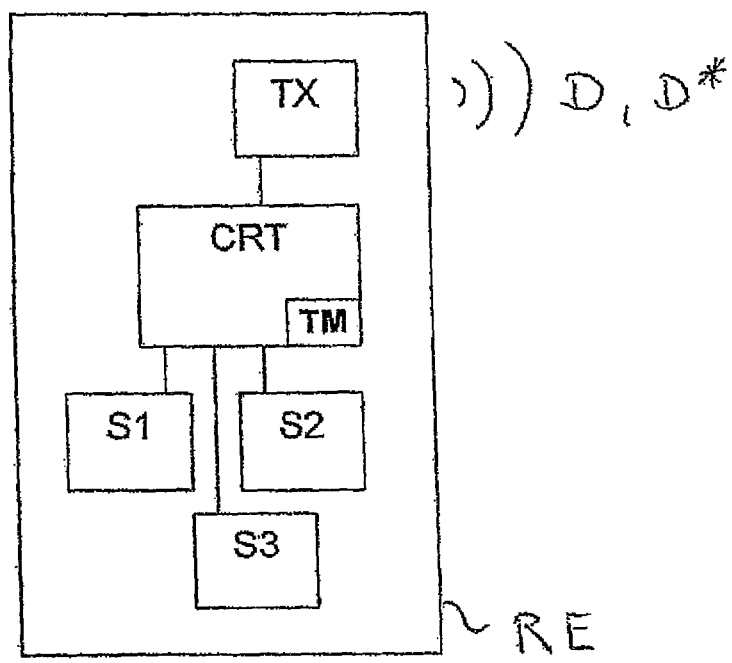
Figure 5:
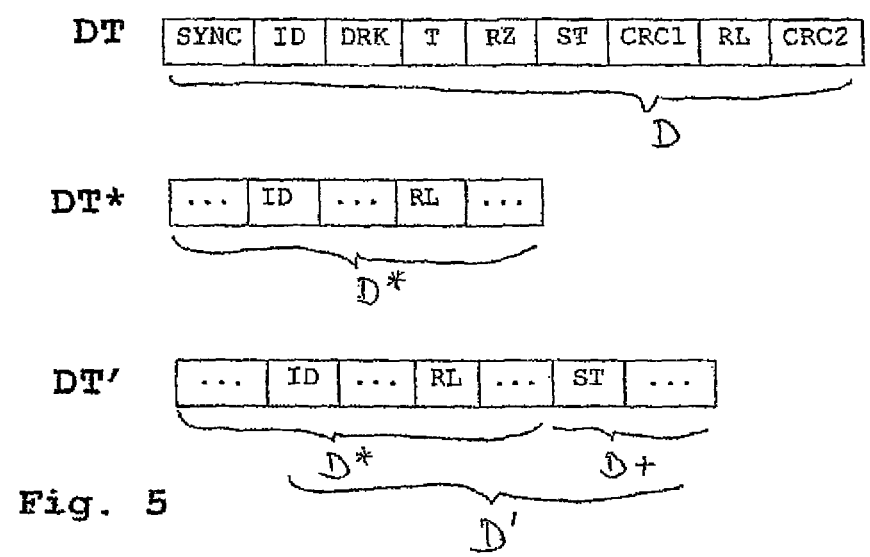

The invention will be described hereinafter in more detail based on different embodiments and with reference to the enclosed drawings, wherein:

FIG. 1 shows the different operating modes that are defined for the method and the system in the form of a state chart;

FIG. 2 shows the method according to the invention, including the individual steps thereof, in the form of a flow chart;

FIG. 3 is a schematic illustration of the arrangement of the different system components in a vehicle;

FIG. 4 shows a schematic illustration of the design of an electronic module according to the invention or the wheel electronics unit; and FIG. 5 shows the different datagrams employed in the method and the system.

Figure 6:
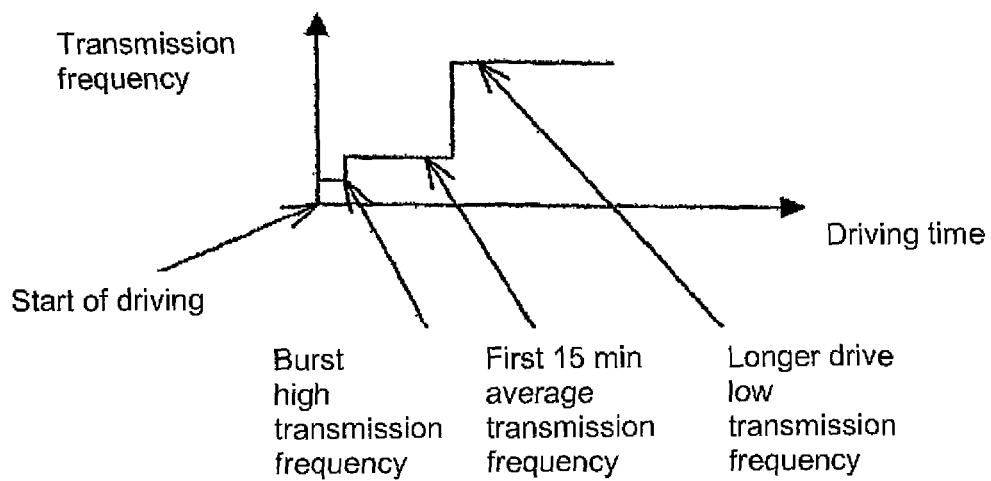

FIG. 6 the dependency of the transmission frequency on the driving time.

DETAILED DESCRIPTION

Before FIGS. 1 and 2 and the method according to the invention will be addressed in more detail, first the basic design of the system according to the invention will be explained based on FIGS. 3 and 4.

FIG. 3 shows the basic design and/or the installation of a system in a vehicle FZ, wherein electronic modules or wheel electronics units RE are inserted in the individual wheels R1 to R4 of the vehicle, which wirelessly transmit the data thereof D1* to D4* to a controller STG, which is disposed in the vehicle as a central control unit.

The controller STG is connected to a wireless receiving means in the form of an antenna A in order to receive the radio signals of the individual wheel electronics units RE and evaluate the data contained therein. The controller STG is connected to further devices and/or modules (not shown) by way of a data interface or a data bus and supplies these with results data D' obtained from the evaluation of the received data D1* to D4* and optionally further additional data.

The controller STG or the antenna is not located at the center of the vehicle FZ, but is preferably disposed asymmetrically to the transverse axis of the vehicle, which is to say either in the front or in the rear part of the vehicle. In this way, the radio signals of the individual wheel electronics units RE are received by the antenna A of the controller STG with varying received field intensities, whereby it can be determined whether the respective wheel electronics unit is located in the front part V or the rear part H of the vehicle FZ.

FIG. 4 shows the design of a wheel electronics unit RE integrated in a wheel in the form of a block diagram. The wheel electronics unit substantially comprises a microcontroller CRT, which has an integrated timer TM and is connected to different sensors S1 to S3. The sensors, for example, are a pressure sensor S1, a temperature sensor S2, and at least one acceleration sensor S3. The microcontroller CRT processes the data supplied by the sensors and forwards the data to a transmission unit TX, which in turn transmits the data D or D* by radio to the controller STG.

The mode of operation of the system that is described and of the components thereof, as well as the principle of the method according to the invention, will now be described in more detail based on FIGS. 1 and 2 and FIG. 5:

In the method according to the invention, at least during the starting phase of the vehicle, data D* is transmitted from the respective electronic module or the respective wheel electronics unit RE to the controller STG at least intermittently in the form of a plurality of datagrams DT*, which contain the same data D* and are consecutively transmitted in a cumulative manner.

This mode is denoted as mode BM in FIG. 1 and is therefore also referred to as the accumulation mode or burst mode. This mode is preferably only operated in the starting phase, which is to say in the state in which the vehicle transitions from a stopped mode SM into a driving mode FM. The burst mode BM notably refers to the starting phase of the vehicle, during which the individual wheel electronics units RE transmit the data D* in cumulative, preferably shortened, datagrams DT* to the controller STG, which is then able to determine in particular the respective wheel position based on the data.

Once the starting phase of the vehicle has ended and the vehicle is in the actual driving mode FM, data D is transmitted in the form of longer datagrams DT, wherein an accumulation, as in the burst mode, can be foregone. The data transmitted in the driving mode FM should contain all the information that the wheel electronics unit RE can possibly provide to the controller STG. In contrast, in the burst mode BM only data D* that is required for detecting the individual wheel positions is transmitted, such as information about the direction of rotation RL of the wheel and/or an identifier ID or the identity of the wheel itself.

Once the driving state of the vehicle has ended, the second mode FM is exited and a transition into the stopped mode SM takes place. In this mode SM, preferably no data is emitted by the wheel electronics unit RE. As soon as the vehicle FZ starts to move again, which can be detected by way of an acceleration sensor (see S3 in FIG. 4), for example, the transition into the starting mode or burst mode BM takes place. As is shown in FIG. 1, the state of the vehicle from a first mode SM, which describes the stopped state of the vehicle, into a second mode FM, which describes the driving state of the vehicle, is switched by way of an intermediate mode, which corresponds to a further mode, this being the burst mode BM. This third mode BM relates to the respective starting state of the vehicle.

Based on FIG. 2, the method 100, including the steps 110 to 130 thereof, will now be described in more detail, with reference also being made to FIGS. 1 and 5.

The method 100 begins with a step 110, in which a switch is made from the first mode SM into the third mode BM, the starting mode. This is detected, for example, based on acceleration sensors (see sensor S3 in FIG. 4) and can also be controlled based on a timer (see timer TM in FIG. 4) such that this mode BM is maintained only for a limited duration. In a step 115, the data transmission is carried out for this mode BM in that the respective module or the wheel electronics unit RE transmits the data D* in a plurality of accumulated datagrams to the controller STG.

As is shown in FIG. 5, the particular wheel electronics unit RE transmits a shortened datagram DT*, which comprises only some data D* of the customarily plurality of data D, which in the normal driving mode FM is transmitted in longer datagrams DT. The short datagram DT*, for example, is a 9-byte datagram, which contains at least one unique identifier ID for the respective wheel electronics unit RE, and thus also for the respective wheel, and information RL indicating the direction of rotation of the respective wheel. Even based on the identifiers ID, the controller STG can check whether all wheel electronics units RE are operational or whether at least four different identifiers ID and thus wheels are being detected. In addition, based on the information RL, the controller STG can detect whether the respective wheel is located on the left or right side of the vehicle. For example, if based on the information RL it is indicated that the wheel is turning clockwise, it is assumed that the wheel is located on the right vehicle side R. In the other case, it is assumed that the wheel is located on the left vehicle side L. In this way, based on such little information, an initial localization of wheels can be carried out.

In step 115, additionally the received field strengths of the respectively received signals are evaluated by the controller STG and compared to each other. Because the controller or the antenna A (see also FIG. 3) is located closer to the front of the vehicle or the tail of the vehicle, based on the received field strengths it is easy to determine whether the respective wheel electronics unit RE is located on a front axle V or on a rear axle H of the vehicle FZ. In conjunction with the previously determined side and/or the direction of rotation of the wheel electronics unit (left or right vehicle side), in this way, a precise position determination of the individual wheels is achieved. Thus, if based on the information RL, for example, a wheel turning clockwise is indicated, and if a relatively high received field strength is detected by the controller STG in the case that the antenna A is mounted closer to the front axles, it can be assumed that this wheel is located on the right vehicle side R on the front axle V. With respect to the illustration of FIG. 3, in this way the position of the wheel R2 would be clearly detected. The detection of the remaining wheels is carried out in an analogous procedure. In step 115, clear and unique positioning of the individual wheels is possible already based on the short datagrams DT*, and in step 115 a current pressure indication in the FZ is also possible based on individual DT.

In addition, transmitting shortened datagrams DT* in an accumulated manner, or in the burst mode, ensures that the required data is received completely and correctly by the controller STG. In addition to the information ID and RL already mentioned above, the shortened datagram DT* can also contain further data, such as synchronization data and test data, such as checksum data.

In total, however, the datagram DT* is clearly shorter than the conventional datagram DT. For example, the datagram DT* comprises only 9 bytes, while the longer datagram DT comprises 15 bytes. As is shown in FIG. 5, the longer datagram DT, which is transmitted in the later driving mode FM, may also contain information about the pressure state DRK and about the temperature T in the respective tire. This data is captured by way of the appropriate sensors, these being the pressure sensor S1 and the temperature sensor S2 (see FIG. 4). In addition, the datagram DT may also contain information RZ about the residual service life of the battery.

The method proposed here utilizes the above-mentioned burst mode BM representing an accumulation of shortened datagrams DT* for transmissions while starting to move the vehicle. Within a short time period, such as 1 minute, in this way many datagrams DT* having the same or at least a similar data content are transmitted. Because of this type of transmission, very fast wheel allocation is possible, wherein additionally energy is saved because of the shortened datagram length, for example, from 15 bytes to 9 bytes. If, for example, 25 datagrams are consecutively transmitted in an accumulation, a reduction of the power demand by approximately 40% is achieved given the shortening of the datagram DT* compared to the regular datagram DT. This is achieved without any loss of information whatsoever.

Once the starting phase or the mode BM has ended, in a step 120 a switch is carried out to the next mode, this being the mode FM, which relates to the driving state of the vehicle. In a step 125 then, the longer datagram DT is used in order to transmit all captured data D to the extent possible from the respective wheel electronics unit RE to the controller STG. In this mode FM as well, an accumulated transmission of the datagram DT may, but does not have to, take place. In a step 130, after ending the path state, a transition takes place into the stopped state, this being the mode SM. As was already described above, no data transmission is carried out in this first mode SM.

The different modes overall thereby enable optimal data transmission with respect to the information content and energy savings. Because of the proposed differentiation between the actual driving state and the starting state of the vehicle, optimized data transmission by way of shortened datagrams is enabled, notably for the starting phase of the vehicle.

In addition to the actual data transmission between the respective wheel electronics unit RE and the controller STG, the invention also comprises a further transmission of result data DT' (see FIG. 5) from the controller STG to further devices or modules installed in the vehicle, such as display apparatuses in the instrument panel.

For this purpose, the controller STG evaluates the received data D or D* and supplements it optionally with further data D+, so as to form results data D'. This data is transmitted, for example, by way of a standardized bus data datagram DT' to the further devices or modules. A status bit or byte ST, for example, which relates to the received field strengths determined by the controller STG and which indicates whether the respective wheel electronics unit RE is located on a front axle or rear axle of the vehicle, can be regarded as additional data D+. The status bit ST can thus take on the state V or the state H (see FIG. 3). In conjunction with the information RL which can take on the status L or R and is transmitted by the wheel electronics unit, it provides a unique wheel allocation.

The method described here, and the apparatuses and units carrying out the method relate to particularly advantageous embodiments and should not be interpreted as restrictive. The scope of protection of the invention rather also comprises further modifications and is determined in particular by the wording of the claims.

LIST OF REFERENCE NUMERALS

SM First mode (stopped mode)
FM Second mode (driving mode)
BM Third mode (burst mode)
100 Method comprising (partial) steps 110-130
DRK Information about pressure conditions in wheels (R1-R4)
FZ Vehicle
STG Controller
A Antenna
BUS Interface or data bus
R1-R4 Wheels
RE Electronic module or wheel electronics unit
S1, S2, S3 Different sensors for pressure (S1), temperature (S2) and acceleration (S3)
CRT Microcontroller
TX Transmitter (in wheel electronics unit)
D Data (regular scope) of wheel electronics unit
D* Data (shortened scope) of wheel electronics unit
D+ Additional data from controller
D' Results data from controller (for data bus)
DT Datagram (regular)
DT* Datagram (shortened)
DT' Datagram (for results data on data bus)
ID, RL, DRK,
T, RZ, ST Data or information about respective wheel/tire, particularly identifier (ID), right-left (RL), pressure (DRK)
SYNC,
CRC1, CRC2 Data regarding synchronization or for plausibility check (checksum)

The invention claimed is:

1. A method for monitoring and wirelessly signaling data containing information about a pressure condition present in pneumatic tires of wheels of a vehicle, the data being transmitted wirelessly by electronic modules disposed in the wheels to a controller disposed in the vehicle, wherein a first mode is associated with a stopped state of the vehicle, wherein the data is transmitted in a form of datagrams by a respective electronic module to the controller during a second mode associated with a starting state of the vehicle, wherein the data is transmitted in the form of datagrams by the respective electronic module to the controller during a third mode associated with a driving state of the vehicle, wherein the datagrams containing the data are transmitted per n unit of time to the controller by the respective electronic module intermittently with n being a function of time, wherein the third mode of the driving state comprises a lower transmission rate as compared to the second mode of the starting state.

2. The method according to claim 1, wherein the data is transmitted during a fourth mode with an even lower transmission rate as compared to the third mode, the fourth mode being associated with a second driving state of the vehicle.

3. The method according to claim 2, wherein the fourth mode begins approximately 15 minutes after starting to drive.

4. A method for monitoring and wirelessly signaling data that contains information on a pressure in tires of wheels of a vehicle, wherein the data are transmitted wirelessly in a form of telegrams by electronic modules disposed in the wheels to a control device disposed in the vehicle, the electronic modules being switched by an acceleration sensor from a first mode which is assigned to a standstill state of the vehicle to a starting mode which is assigned to a starting-off state of the vehicle, the electronic modules send in the starting mode telegrams which contain information on a direction of rotation or an identification and which are shortened by containing no information on a temperature in the wheel.

5. A method for monitoring and wirelessly signaling data that contain information on a pressure in tires of wheels of a vehicle, wherein the data are transmitted wirelessly in a form of telegrams by electronic modules disposed in the wheels to a control device disposed in the vehicle, the electronic modules being switched by an acceleration sensor from a first mode which is assigned to a standstill state of the vehicle to a starting mode which is assigned to a starting-off state of the vehicle, the electronic modules send in the starting mode telegrams which contain information on a direction of rotation or an identification and which are shortened by containing no information on the pressure in the wheel.

\* \* \* \* \*